United States Patent
He

(12) 
(10) Patent No.: US 6,181,485 B1
(45) Date of Patent: Jan. 30, 2001

(54) HIGH NUMERICAL APERTURE OPTICAL FOCUSING DEVICE FOR USE IN DATA STORAGE SYSTEMS

(75) Inventor: Chuan He, Fremont, CA (US)

(73) Assignee: Read-Rite Corporation, Fremont, CA (US)

(*) Notice: Under 35 U.S.C. 154(b), the term of this patent shall be extended for 0 days.

(21) Appl. No.: 09/338,888

(22) Filed: Jun. 23, 1999

(51) Int. Cl.[7] .......................... G02B 13/18; G02B 21/00; G02B 1/06; G11B 11/00; G11B 7/00
(52) U.S. Cl. .................... 359/719; 359/383; 359/665; 369/13; 369/14; 369/112
(58) Field of Search .................... 359/665, 661, 359/664, 719, 383; 369/13, 14, 112

(56) References Cited

U.S. PATENT DOCUMENTS

| | | | |
|---|---|---|---|
| 4,634,234 | 1/1987 | Baumann | 350/414 |
| 5,004,307 | 4/1991 | Kino et al. | 350/1.2 |
| 5,039,192 | 8/1991 | Basu | 385/31 |
| 5,042,928 | 8/1991 | Richards | 359/728 |
| 5,125,750 | 6/1992 | Corle et al. | 350/819 |
| 5,497,359 | 3/1996 | Mamin et al. | 369/44.15 |
| 5,689,480 | 11/1997 | Kino | 369/14 |
| 5,805,346 | * 9/1998 | Tonimatsu | 359/656 |
| 5,881,042 | 3/1999 | Kinght | 369/99 |
| 6,104,687 | * 8/2000 | Lee et al. | 369/112 |

FOREIGN PATENT DOCUMENTS

758753 A2-A3   2/1996 (EP) .

OTHER PUBLICATIONS

Lee, C.W., et al., "Feasibility Study on Near Field Optical Memory Using A Catadioptric Optical System", Optical Data Storage, Technical Digest Series, vol. 8, pp. 137–139, May 10–13, 1998.

Mansipur, M. et al. "Parallel Processing", Scanning Optical Microscopy, Part 2, 42 Optics and Photonics News, pp. 42–45, Jun. 1998.

* cited by examiner

*Primary Examiner*—Georgia Epps
*Assistant Examiner*—David N. Spector
(74) *Attorney, Agent, or Firm*—Samuel A. Kassatly

(57) ABSTRACT

A near-field optical or magneto-optical data storage system uses an optical focusing device for focusing an incident optical beam to a small size focal spot. The optical focusing device includes an objective lens, an optically transparent base plate, and an optically transparent adapter. The adapter is secured to, and disposed intermediate the objective lens and the base plate, and includes an opening that faces the base plate. A fluid fills the adapter opening to form a fluid cell when the adapter is secured to the base plate. The fluid has an index of refraction that substantially matches the index of refraction of the base plate.

20 Claims, 6 Drawing Sheets

HIGH NUMERICAL APERTURE OPTICAL FOCUSING DEVICE FOR USE IN DATA STORAGE SYSTEMS

BACKGROUND OF THE INVENTION

1. Field of the Invention

The present invention relates in general to optical focusing devices, and it particularly relates to a high numerical aperture (NA) optical focusing device. More particularly, the present invention relates to an optical focusing device that generates an evanescent optical field for enabling its use in data storage systems such as optical and magneto-optical (MO) disk drives.

2. Description of Related Art

In a MO storage system, a thin film read/write head includes an optical assembly for directing and focusing an optical beam, such as a laser beam, and an electro-magnetic coil that generates a magnetic field for defining the magnetic domains in a spinning data storage medium or disk. The head is secured to a rotary actuator magnet and a voice coil assembly by a suspension and an actuator arm positioned over a surface of the disk. In operation, a lift force is generated by the aerodynamic interaction between the head and the disk. The lift force is opposed by equal and opposite spring forces applied by the suspension such that a predetermined flying height is maintained over a full radial stroke of the rotary actuator assembly above the surface of the disk.

A significant concern with the design of the MO head is to increase the recording or areal density of the disk. One attempt to achieve objective has been to reduce the spot size of the light beam on the disk. The diameter of the spot size is inversely proportional to the numerical aperture (NA) of an objective lens forming part of the optical assembly, and proportional to the wavelength of the optical beam. As a result, the objective lens is selected to have a large NA. However, the NA in objective lenses cannot be greater than 1 if the focusing spot is located in free space, thus limiting the spot size.

Another attempt to reduce the spot size and to increase the recording areal density has been to use solid immersion lenses (SILs) with near field recording, as exemplified by the following references:

U.S. Pat. No. 5,125,750, titled "Optical Recording System Employing a Solid Immersion Lens".

U.S. Pat. No. 5,497,359, titled "Optical Disk Data Storage System With Radiation-Transparent Air-Bearing Slider".

Yet another attempt at improving the recording head performance proposes the use of near-field optics, as illustrated by the following reference:

U.S. Pat. No. 5,689,480, titled "Magneto-Optic Recording System Employing Near Field Optics".

U.S. Pat. No. 5,881,042, titled "Flying Head with Solid Immersion Lens Partially Mounted on a Slider".

A catadioptric SIL system is described in the following references, and employs the SIL concept as part of the near-field optics:

Lee, C. W., et al., "Feasibility Study on Near Field Optical Memory Using A Catadioptric Optical System", Optical Data Storage, Technical Digest Series, Volume 8, pages 137–139, May 10–13, 1998; and "Parallel Processing", 42 Optics and Photonics News, pages 42–45, June 1998.

While this catadioptric SIL system can present certain advantages over conventional SILs, it does not appear to capture the entire incident, collimated beam. This represents a waste of valuable energy that could otherwise increase the evanescent optical field.

Other concerns related to the manufacture of MO heads are the extreme difficulty and high costs associated with the mass production of these heads, particularly where optical and electro-magnetic components are assembled to a slider body, and aligned for optimal performance. In addition, the sphericity of the SIL limits the choice of optical material with high index of refraction and could increase the manufacturing cost of the SIL.

SUMMARY OF THE INVENTION

One aspect of the present invention is to satisfy the long felt, and still unsatisfied need for a near-field optical or MO data storage system that uses an optical focusing device for focusing an incident optical beam to a small size focal spot. The focusing device broadens the selectivity of the SIL optical material and can be mass produced at wafer level.

According to one embodiment of the present invention, the optical focusing device includes an objective lens, an optically transparent base plate, and an optically transparent adapter. The adapter is secured to, and disposed intermediate the objective lens and the base plate, and includes an opening that faces the base plate. A fluid fills the adapter opening to form a fluid cell when the adapter is secured to the base plate. The fluid has an index of refraction that substantially matches the index of refraction of the base plate.

BRIEF DESCRIPTION OF THE DRAWINGS

The features of the present invention and the manner of attaining them will become apparent, and the invention itself will be understood by reference to the following description and the accompanying drawings, wherein.

Similar numerals in the drawings refer to similar or identical elements. It should be understood that the sizes of the different components in the figures may not be in exact proportion, and are shown for visual clarity and for the purpose of explanation.

DETAILED DESCRIPTION OF THE INVENTION

Figure 1:
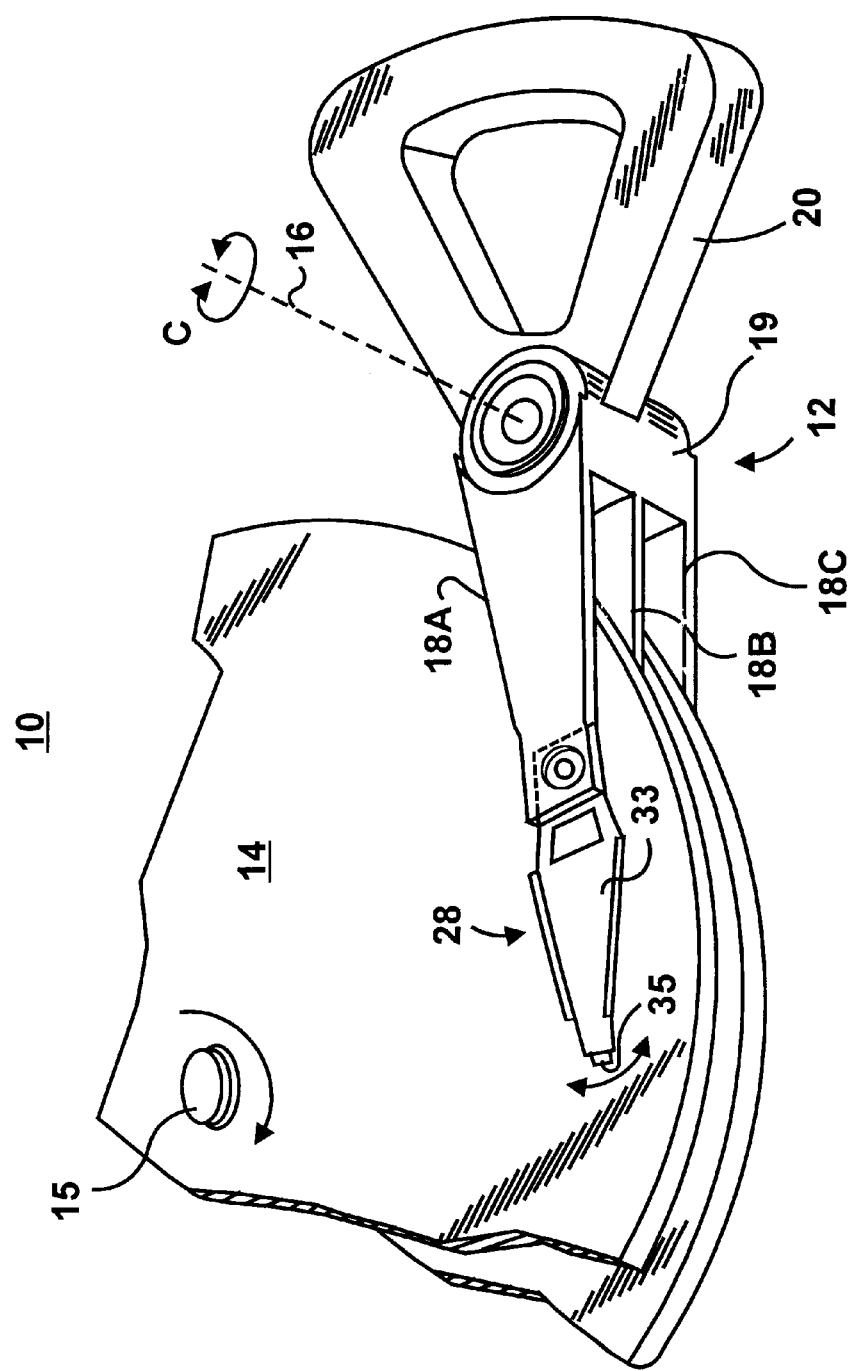
FIG. 1 is a fragmentary perspective view of a data storage system utilizing a read/write head comprised of an optical focusing device according to the present invention.

FIG. 1 illustrates a disk drive 10 comprised of a head stack assembly 12 and a stack of spaced apart magnetic data storage disks or media 14 that are rotatable about a common shaft 15. The head stack assembly 12 is rotatable about an actuator axis 16 in the direction of the arrow C. The head stack assembly 12 includes a number of actuator arms, only three of which 18A, 18B, 18C are illustrated, which extend into spacings between the disks 14.

The head stack assembly 12 further includes an E-shaped block 19 and a magnetic rotor 20 attached to the block 19 in a position diametrically opposite to the actuator arms 18A, 18B, 18C. The rotor 20 cooperates with a stator (not shown) for rotating in an arc about the actuator axis 16. Energizing a coil of the rotor 20 with a direct current in one polarity or the reverse polarity causes the head stack assembly 12, including the actuator arms 18A, 18B, 18C, to rotate about the actuator axis 16 in a direction substantially radial to the disks 14.

Figure 2:
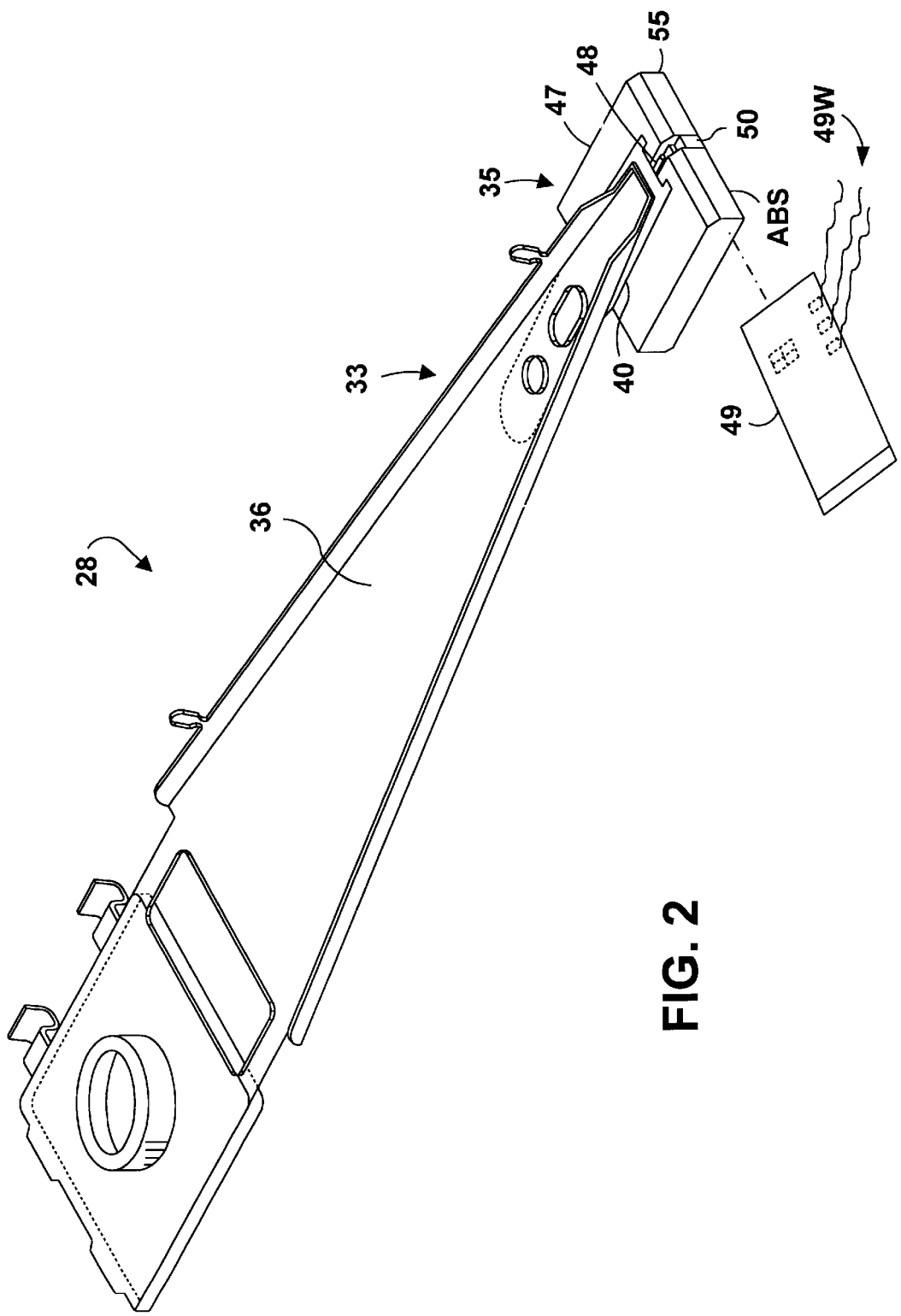
FIG. 2 is a perspective view of an exemplary head gimbal assembly comprised of a suspension and a slider to which the read/write head of FIG. 1 is secured, for use in a head stack assembly.

A head gimbal assembly (HGA) 28 is secured to each of the actuator arms, for example 18A. With reference to FIG. 2, the HGA 28 is comprised of a suspension 33 and a read/write head 35. The suspension 33 includes a resilient load beam 36 and a flexure 40 to which the head 35 is secured.

Figure 3:
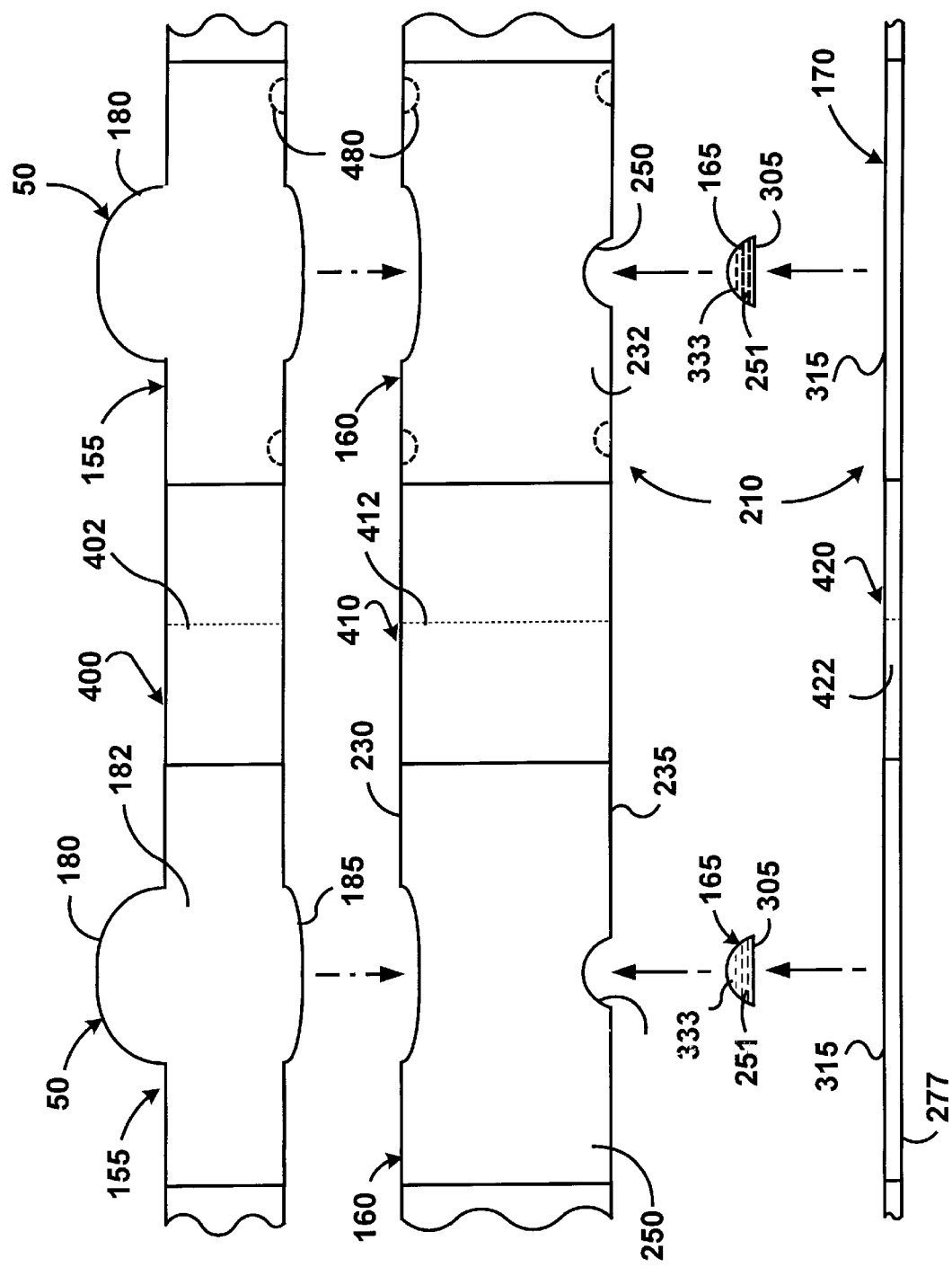
FIG. 3 is an enlarged exploded view of the focusing device of FIG. 2, with selective cross-hatching for added clarity, illustrating a batch or wafer level manufacturing process according to the present invention.

The head 35 is formed of a slider (or slider body) 47 which is secured to the free end of the load beam 36 by means of the flexure 40, and an optical focusing device (also referred to as near field lens) 50 which is secured to the slider 47. The head 35 further includes an optical beam delivery means, such as a waveguide or a fiber 48. Alternatively, the delivery means can be carried out in free space. A stationary or a micro-machined dynamic mirror (or another reflective surface) 49 with wires 49W, can be secured to a trailing edge 55 of the slider 47 at a 45 degree angle relative to the optical beam emanating from the fiber 48, so as to reflect the optical beam onto the focusing device 50, in order to transduce data to and from a storage medium 14 (FIG. 3).

Though an exemplary slider 47 will be described herein for illustration purpose only, it should be clear that other conventional or suitable sliders can be used. In the present illustration, the slider 47 includes a fiber channel 61 (FIG. 2) for receiving the optical fiber 48. Though the fiber channel 61 is illustrated as being centrally located along a generally central axis of the slider 47, it should be understood that the location of the fiber channel 61 can be offset relative to a central axis of symmetry of the slider 47. In a design where the optical beam is delivered through free space, for example when a fiber is not used, the optical beam can be transmitted through the fiber channel 61 or a waveguide formed within the fiber channel 61.

The details of the focusing device 50 will now be described with reference to FIGS. 3 through 7. The focusing device 50 is optically transmissive and is comprised of four components: an objective lens 155, an adapter 160, a fluid cell 165, and a bottom plate 170.

While the objective lens 155 is described and illustrated in relation to a specific design, it should be understood that the present invention is not limited to the lens design described herein and can be used with other available objective lenses. The objective lens 155 is integrally defined by an aspherically shaped incident surface 180, a body 182, and a generally aspherically shaped exit surface 185. The terms "incident" and "exit" are selected for the purpose of convenience and are not intended to limit the direction of travel of the optical beam 200 (FIG. 4) through the objective lens 155. The optical beam 200 can travel through the objective lens 155 in the direction shown in the FIG. 4, or alternatively, its direction can be reversed to the opposite direction.

The objective lens 155 provides the necessary focusing power with minimum aberration. The incident surface 180 and the exit surface 185 are oppositely disposed relative to the body 182, such that an optical or laser beam 200 (FIG. 4) is focused by the objective lens 155.

The objective lens 155 has a predetermined index of refraction that varies with the application for which the focusing device 50 is design. For example, the index of refraction of the objective lens 155 can range between 1.6 and 2.0.

Figure 4:
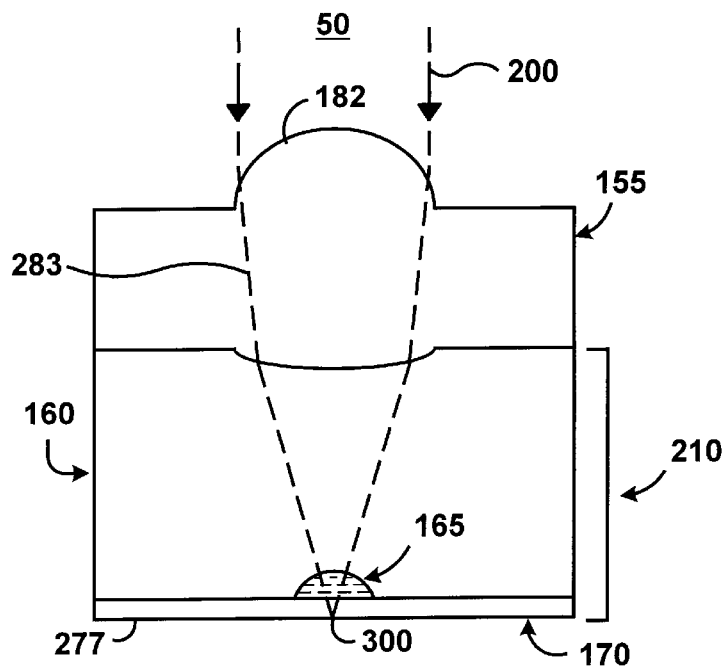
FIG. 4 is a schematic side view of an assembled optical focusing device of FIG. 3, according to a first embodiment of the present invention for use with data storage systems of FIGS. 1 and 2.
Figures 5, 6:
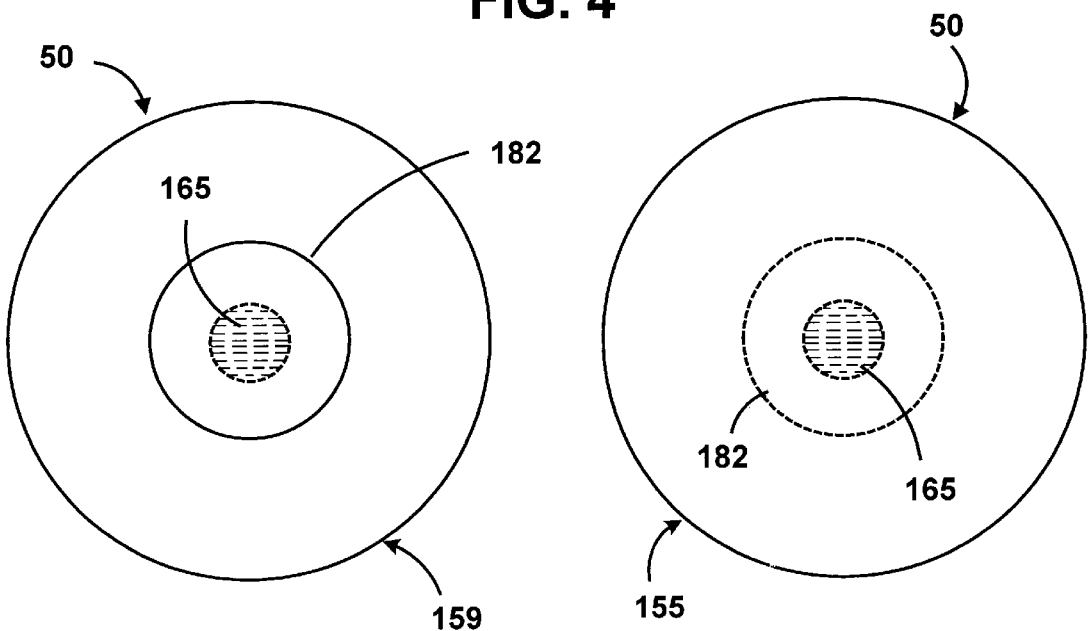
FIG. 5 is a top view of the optical focusing device of FIG. 4.
FIG. 6 is a bottom view of the optical focusing device of FIGS. 4 and 5.

The adapter 160, the fluid cell 165, and the bottom plate 170 collectively define an optical element referred to as fluid matching lens 210 (FIG. 4). The fluid matching lens 210 achieves most if not all the functions of a solid immersion lens (SIL) and further offers additional features. For example, and as it will be explained later in greater detail in connection with FIG. 3, the present focusing device 50 (or the fluid matching lens 210) can be readily mass produced by means of wafer processing techniques such as molding, etching, grounding and so forth.

The use of the fluid cell 165 enables the use of a flat base plate 170. The flatness of the base plate 170 presents a significant advantage in the wafer level, mass production of the focusing device 50. This feature makes it possible to base the selection of the materials of the fluid cell 165 and the base plate 170 solely on the desired high index of refraction and the high optical transmission of the materials, rather than basing the selection on factors that are not directly related to the optical performance of the focusing device 50. Some of these extrinsic factors include determining whether or not the fluid matching lens 210 can be molded or can be made using special fabrication processes. As an example, the base plate 170 can now be made from a broad range of crystal, glass, plastic, or any other suitable semiconductor material, or moldable or etchable material.

The adapter 160 is a cylindrical, single-piece optically transparent component having a low index of refraction. In a preferred embodiment, the index of refraction is preferably selected as low as possible, in order to increase the power of the objective lens. As an example, the index of refraction of the adapter 160 can range between 1.2 and 1.5.

The adapter 160 is defined by an incident surface 230, a body 232, and an exit surface 234. The incident surface 230 and the exit surface 234 are patterned on two opposite sides of the body 232. The incident surface 230 faces the objective lens 155, and matches the shape of the exit surface 185. The exit surface 234 of the adapter 160 faces the base plate 170, and includes an opening 250 which is generally spherically shaped.

The shape of the opening 250 determines the shape of the fluid cell 165. In one embodiment, the opening 250 together with the base plate 170, forms a hemisphere with a partial spherical section. According to other embodiments, the opening 250 together with the base plate 170 can be formed as a hyper-hemisphere (super-hemisphere), or other similar shapes, as required by the specific application in which the focusing device 50 is used. In one embodiment, the fluid matching lens is aplanatic (i.e., aberration-free). In another embodiment, the fluid matching lens is not aplanatic so that the objective lens to achieve overall system-level aplanatic performance.

The opening 250 is filled with an index matching fluid, i.e., liquid or gel 251, that assumes the shape of the opening 250, to form the fluid cell 165. In a preferred embodiment, the fluid cell 165 has an index of refraction which matches that of the base plate 170 in order to avoid refraction between the index matching fluid and the base plate 170, and therefore to maintain the aplanatic performance. The adapter 160 helps the objective lens 155 focus the optical beam 200 on, or adjacent to a bottom surface 277 of the base plate 170. When the focusing device 50 or the fluid matching lens 210 is used in conjunction with a slider 47 or a data storage device such as the disk drive 10, the bottom surface 277 is also referred to as an air bear surface (ABS) of the focusing device 50, since the ABS 277 faces the data storage medium 14.

The adapter 160 is intended to house the index matching fluid 251, and further provides a correct and accurate spacing between the objective lens 155 and the fluid cell 165 and/or the base plate 170. The numerical aperture of the objective lens 155 is taken into consideration when selecting the radius of curvature of the opening 250, and thickness of the adaptor and base plate.

As an example, according to one embodiment, the laser beam is focused at the bottom surface of the hemispherical fluid cell 165, at the center of the fluid cell 165. To this end, the high NA objective lens is selected first, followed by the selection of the following parameters: radius of curvature of the opening 250, the thickness of the adapter 160, and the thickness of the base plate 170, in order to form the bottom surface of the base plate 170.

Once the material of the base plate 170 has been determined, the index matching fluid 251 can be selected and produced. The base plate 170 is preferably flat, and aims at increasing the final numerical aperture of the focusing device.

Figure 7:
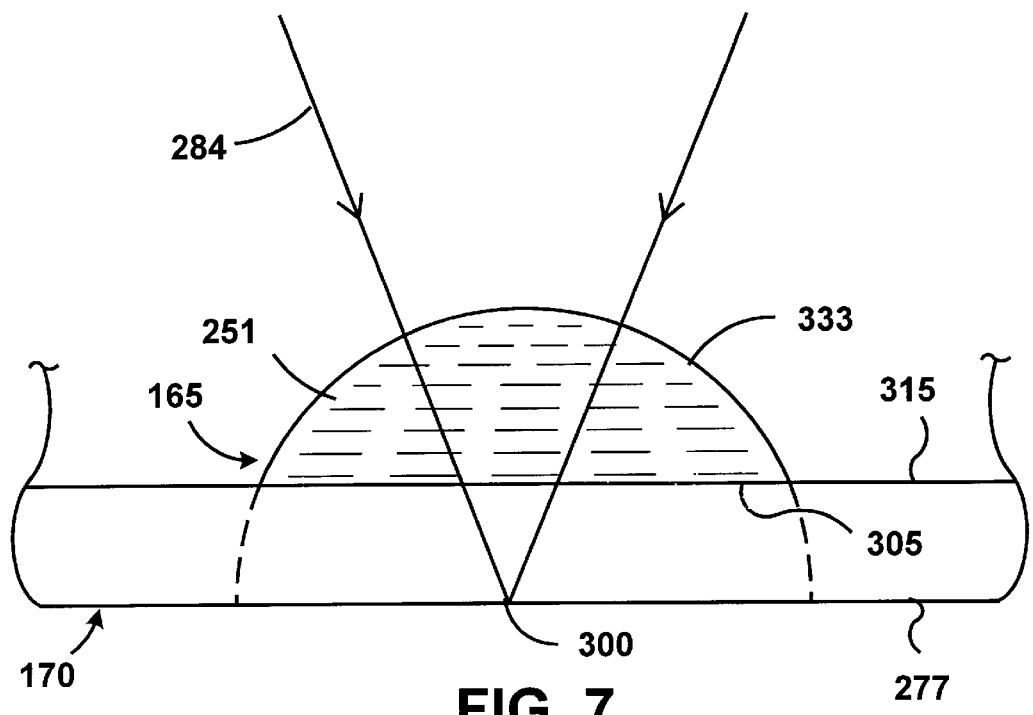
FIG. 7 is a greatly enlarged side view of the optical focusing device of FIGS. 2 through 6, illustrating an optical path according to the first embodiment of the present invention.

The operation of a preferred embodiment of the focusing device 50 is illustrated in FIGS. 4 and 7. The optical beam 200 impinges upon the incident surface 180 of the objective lens 155 and is refracted by the lens body 182, as refracted beam 283. The beam 283 exits the objective lens 155 through the exit surface 185, and impinges upon the incident surface 230 of the adapter 160. The beam 283 is refracted as a focused beam 284 that passes through the body 232 of the adapter 160.

In the embodiment of FIG. 7, the fluid cell 165 is spherically shaped with its geometrical center located at, or close to the bottom surface 277 of the base plate 170. As a result, the focused beam 284 enters the fluid cell 165 without refraction, and is focused at the center of the fluid cell 165, as a focal point 300.

The focused beam 284 exits the flat exit surface 305 of the fluid cell 165 and impinges upon the flat upper surface 315 of the base plate 170. The focused beam 284 passes through the base plate 170 without being refracted thereby due to the matching of the indices of refraction of the fluid cell 165 and the base plate 170. The resulting focal point 300 of the focusing device 50 is therefore located at, or close to the bottom surface 277 of the base plate 170.

Figure 8:
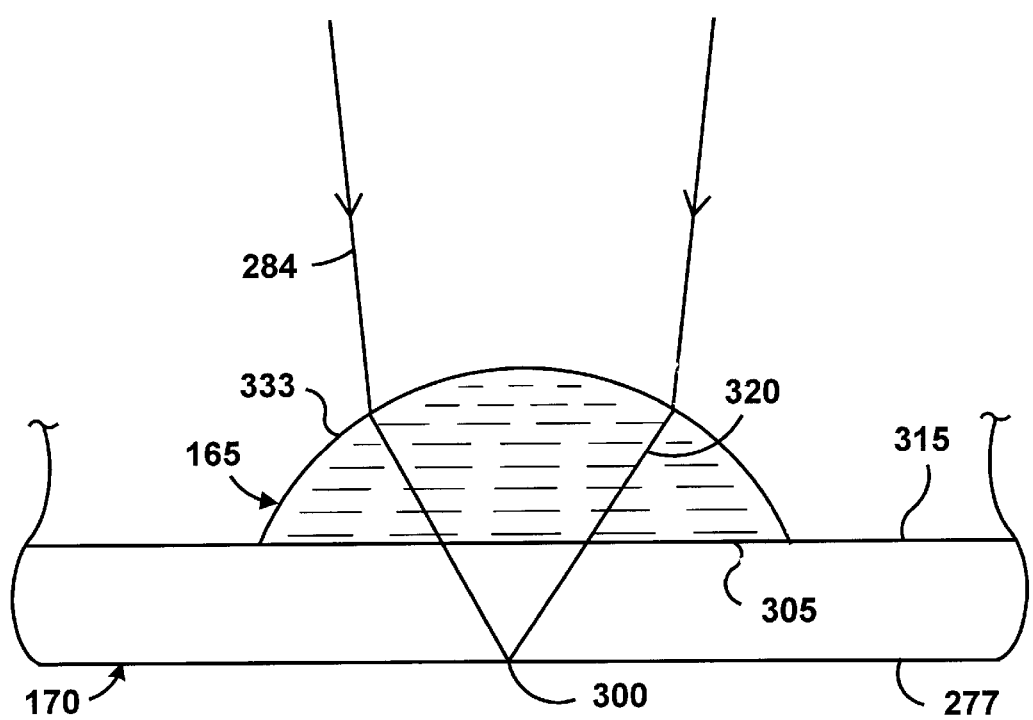
FIG. 8 is a greatly enlarged side view of the optical focusing device of FIGS. 2 through 6, illustrating an optical path according to a second embodiment of the present invention.

In the alternative embodiment of FIG. 8, the beam 284 is not radial relative to the fluid cell 165, and as a result the beam 284 is refracted as focused beam 320, by the fluid cell 165, as the beam 284 enters the spherical incident surface 333 of the fluid cell 165. The focused beam 320 continues through the base plate 170 without further refraction because the index of refraction of the fluid 251 matches that of the base plate 170. As with the embodiment of FIG. 7, the beam 320 is focused at the focal point 300.

Figure 9:
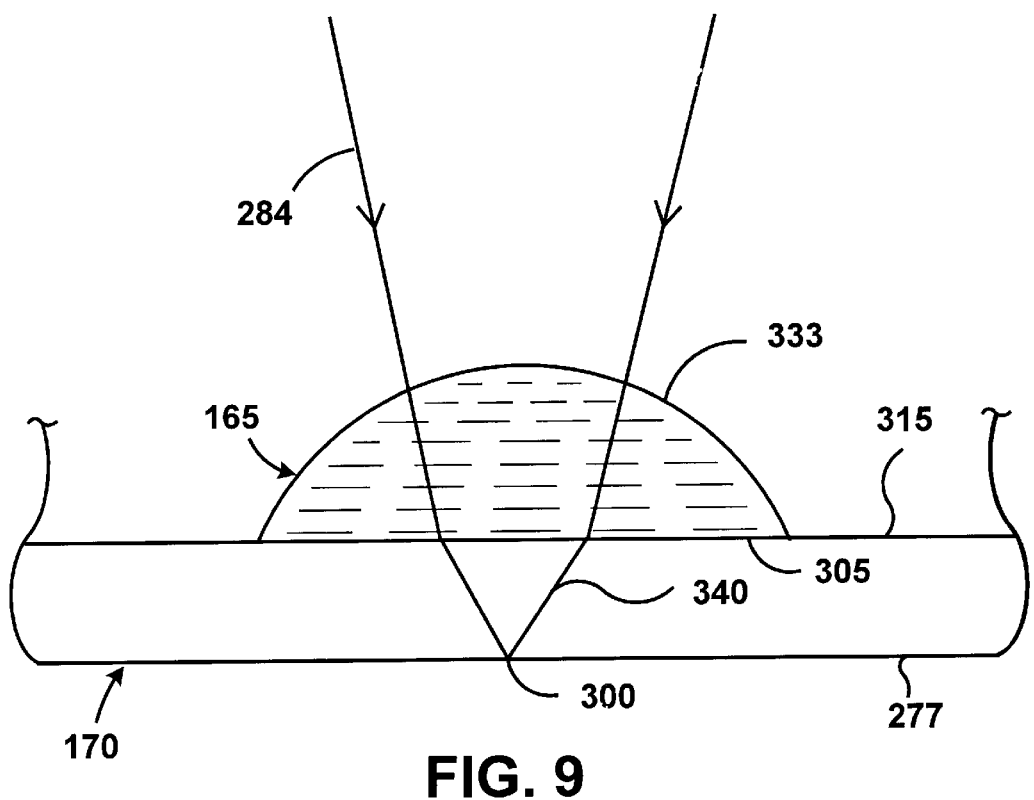
FIG. 9 is a greatly enlarged side view of the optical focusing device of FIGS. 2 through 6, illustrating an optical path according to a third embodiment of the present invention.

In the other alternative embodiment of FIG. 9, the beam 284 can be radial (or non-radial) relative to the fluid cell 165. As a result, the beam 284 enters the fluid cell 165 without being refracted thereby (or alternatively, the beam 284 could be refracted by the fluid cell 165). The beam 284 impinges upon the upper surface 315 of the base plate 170, and is refracted thereby as focused beam 340. The focused beam 340 is focused at the focal point 300. Though this embodiment could introduce additional aberration, the objective lens could be designed to compensate for such aberration and to minimize the overall system aberrations.

The method of manufacturing the focusing device 50 will now be described in connection with FIG. 3. The focusing device 50 can be made using molding, etching, or other suitable manufacturing techniques. The relative flatness of the incident surface 230 and the bottom or exit surface 234 of the adapter 160 helps facilitate the use of wafer processing in the mass production of the focusing device 50. Though each focusing device 50 can be formed individually, such as by molding, it would be more efficient and economical to mass produce the focusing devices 50 in batches, at wafer level.

FIG. 3 illustrates three wafers: an objective lens wafer 400, an adapter wafer 410, and a base plate wafer 420 that are secured together to form a plurality of substantially identical fluid matching lenses 210 and/or a plurality of focusing devices 50. Once the fluid matching lenses 210 the focusing devices 50 are made, the fluid matching lenses 210 and focusing devices 50 are separated into individual units along cutting lines 402, 412, 422 (shown in dashed lines).

The objective lens wafer 400 can be made of a flat glass or another optical sheet which is etched, molded, and/or pressed into the desired shape. The adapter wafer 402 can be made of a flat glass or another optical sheet which is etched, molded, and/or pressed into the desired shape. The base plate wafer 420 can be made of a flat glass or another optical sheet.

The index matching fluid 251 is dispensed in the opening 250 of the adapter exit surface 234, and the objective lens wafer 400, the adapter wafer 410, and the base plate wafer 420 are secured in optical registration with each other, in a predetermined order. A preferred method for secured the three wafers 400, 410, 420 is bonding them by means of an optical adhesive. To this end, a plurality of adhesive relief channels 480 (shown in dotted lines) can be added to the interface surfaces of the three wafers 400, 410, 420.

It should also be understood that the geometry, compositions, and dimensions of the elements described herein can be modified within the scope of the invention and are not intended to be the exclusive. Other modifications can be made when implementing the invention for a particular environment. The use of the focusing device is not limited to data storage devices, as it can be used in various other optical applications, including but not limited to high resolution microscopy, surface inspection, and medical imaging.

What is claimed is:

1. An optical device capable of focusing an incident optical beam to a focal spot, comprising:

an objective lens;

an optically transparent base plate;

an optically transparent adapter secured to, and disposed intermediate said objective lens and said base plate, and including an opening that faces said base plate; and a fluid that fills said adapter opening to form a fluid cell when said adapter is secured to said base plate.

2. An optical device according to claim 1, wherein said bottom surface defines a focal plane on which the focal spot is formed for generating an evanescent field.

3. An optical device according to claim 1, wherein said objective lens is defined by an aspherically shaped incident surface, a body, and a generally aspherically shaped exit surface.

4. An optical device according to claim 1, wherein said objective lens has an index of refraction that ranges between 1.8 and 1.9.

5. An optical device according to claim 1, wherein said base plate includes a generally flat upper surface which faces said adapter and which is secured to said adapter.

6. An optical device according to claim 5, wherein said base plate includes a generally flat bottom surface.

7. An optical device according to claim 6, wherein said fluid has an index of refraction that substantially matches an index of refraction of said base plate so that the optical beam passes through said fluid cell and said base plate without substantial refraction.

8. An optical device according to claim 6, wherein said fluid has an index of refraction which is different from an index of refraction of said base plate so that the optical beam passing between said fluid cell and said base plate is refracted by said base plate or by said fluid cell depending on the direction of the optical beam.

9. An optical device according to claim 1, wherein said base plate is made of any of: crystal, glass, plastic, or semiconductor material.

10. An optical device according to claim 9, wherein said base plate is made of a material that has an index of refraction greater than or equal to 2.

11. An optical device according to claim 10, wherein said base plate index of refraction of the adapter ranges between approximately 1.4 and approximately 1.5.

12. An optical device according to claim 1, wherein said adapter has an index of refraction which is less than or equal to 1.

13. An optical device according to claim 1, wherein said adapter is generally cylindrically shaped.

14. An optical device according to claim 1, wherein said adapter is defined by an incident surface, a body, and an exit surface;

wherein said incident surface and said exit surface are patterned on two opposite sides of said body; and wherein said incident surface faces said objective lens, and is generally aspherically shaped to receive an aspherically shaped exit surface of said objective lens.

15. An optical device according to claim 14, wherein said exit surface of said adapter faces said base plate, and said opening in said adapter exit surface is generally spherically shaped.

16. An optical device according to claim 14, wherein said exit surface of said adapter faces said base plate, and said opening in said adapter exit surface is shaped as a hyper-hemisphere.

17. A fluid matching lens comprising:

an optically transparent base plate;

an optically transparent adapter secured to said base plate and including an opening that faces said base plate; and a fluid that fills said adapter opening to form a fluid cell when said adapter is secured to said base plate.

18. A fluid matching lens according to claim 17, wherein said fluid has an index of refraction that substantially matches an index of refraction of said base plate.

19. A method of making an optical device capable of focusing an incident optical beam to a focal spot, comprising:

forming an objective lens wafer;

forming an optically transparent base plate wafer;

forming an optically transparent adapter;

disposing said adapter intermediate said objective lens wafer and said base plate wafer;

securing said adapter to said objective lens wafer and said base plate wafer;

forming an opening in said adapter that faces said base plate; and filling said adapter opening with a fluid to form a fluid cell when said adapter is secured to said base plate.

20. A method according to claim 19, further including selecting said fluid so that its index of refraction substantially matches an index of refraction of said base plate.

* * * * *